Figure 1:
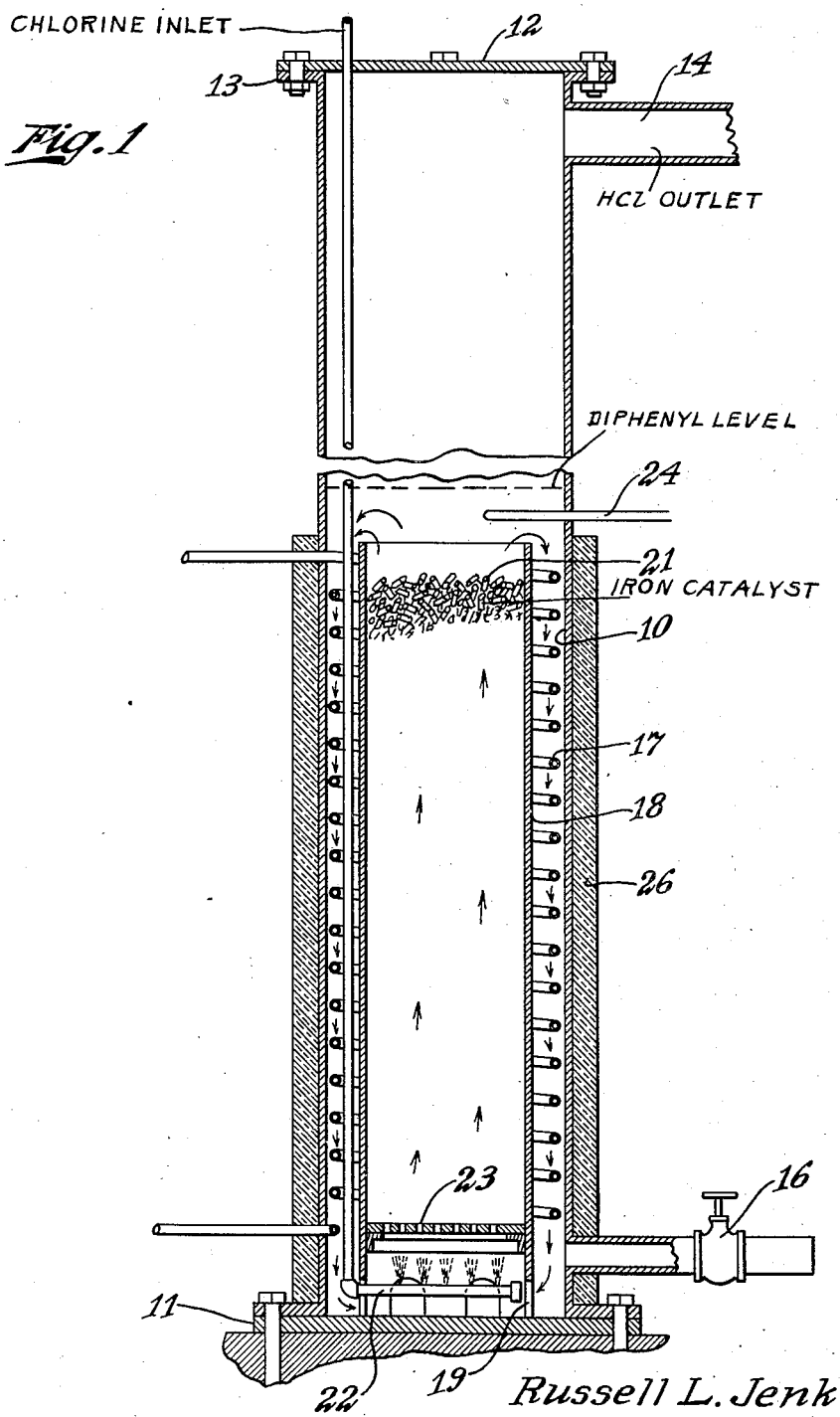

Dec. 27, 1932.   R. L. JENKINS   1,892,397
PROCESS FOR THE PRODUCTION OF CHLORINATED DIARYLS
Filed Sept. 28, 1929   2 Sheets-Sheet 2

A = INCREASE IN WEIGHT OF REACTION MIXTURE IN POUNDS PER POUND OF DIPHENYL.
B = PERCENT COMPLETION. MONOCHLORODIPHENYL.

A = SPECIFIC GRAVITY OF POLY-CHLORINATED DIPHENYL.
B = SAYBOLT VISCOSITY AT 210°F.

Inventor
Russell L. Jenkins
By Johnston & Jennings
Attorneys

UNITED STATES PATENT OFFICE

RUSSELL L. JENKINS, OF ANNISTON, ALABAMA, ASSIGNOR TO SWANN RESEARCH, INC., A CORPORATION OF ALABAMA

PROCESS FOR THE PRODUCTION OF CHLORINATED DIARYLS

Application filed September 28, 1929. Serial No. 395,737.

This invention relates to a method for the production of chlorinated diaryls and has for its object the provision of means whereby varying amounts of chlorine may be substituted in diphenyl, or other diaryls or substituted diaryls, to produce compounds having physical properties ranging all the way from light oils to solids or semi-solids at ordinary temperature.

It has for a further object the provision of apparatus in which this reaction can readily be controlled so as to produce compounds having predetermined properties.

A further object of my invention is to produce a new range of products consisting of chlorinated diphenyl and which vary in consistency from light mobile oils to solids or semi-solids at ordinary temperature.

Previously known methods of chlorinating diphenyl have consisted in passing chlorine into diphenyl containing antimony pentachloride as a catalyst, which reaction yields a monochlorodiphenyl and hydrochloric acid or a dichlorodiphenyl and hydrochloric acid.

I have found that the chlorination of diphenyl and other diaryls, may be more readily carried out by the use of iron as a catalyst, and further that the iron catalyst mass may be so disposed as to greatly increase the rate of the reaction. Further, by suitably controlling the temperature, the time and the rate of flow of chlorine, it is possible to vary the degree of chlorination, producing either the mono-, di-, or even a more highly chlorinated diphenyl.

Furthermore, by varying the size of the iron packing material so as to increase or decrease the surface of the iron packing, I may also vary the rate at which the chlorine is absorbed. For example, if the temperature is maintained between 60° and 80° C., it will be found that when the weight of the reaction mixture has increased by that amount corresponding to 80% to 85% of the increase theoretically required for complete monochlorination, then it will be found that principally monochlorodiphenyl has been formed. On the other hand if the extent of chlorination is carried much beyond 80% to 85% monochlorination, appreciable amounts of dichlorodiphenyl are formed.

If now it is desired to produce more highly chlorinated products than the dichloro diphenyl the chlorination is continued for a longer time. As chlorination proceeds, the reaction mixture becomes more viscous and the rate of absorption of chlorine decreases so that it may be desirable to increase the temperature of the reaction mixture. By gradually increasing the temperature to 175° to 220° C. it is possible to chlorinate smoothly and rapidly to a mixture of chlorinated diphenyls with an average chlorine content corresponding to from 7 to 8 chlorine atoms for each molecule of diphenyl.

Figure 2:
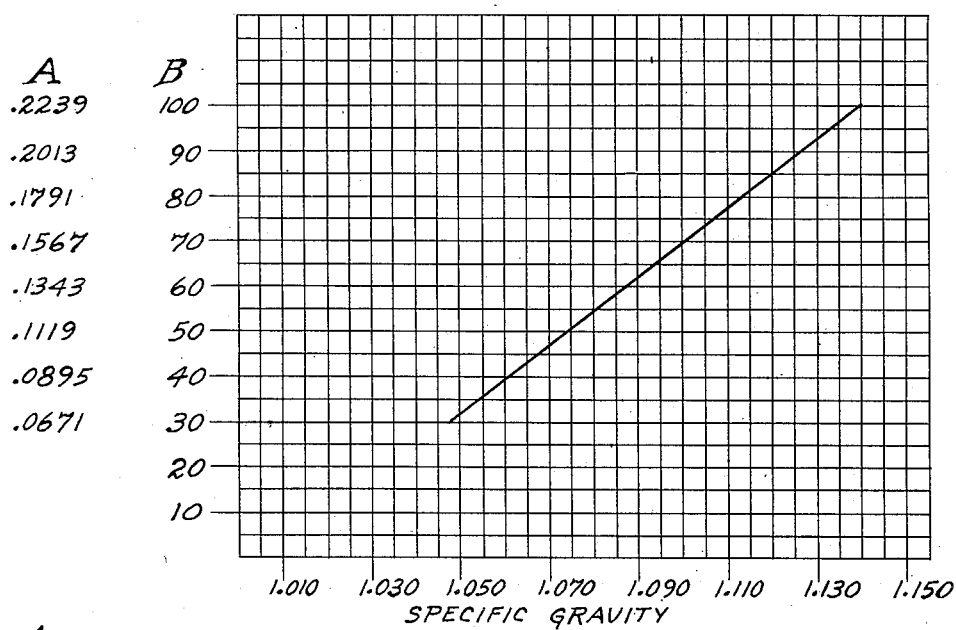
Figure 3:
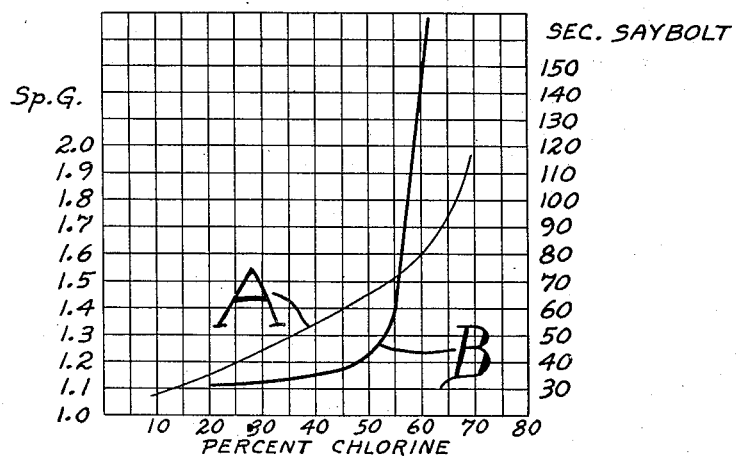

The particular apparatus in which I have found it desirable to carry out the chlorination of diphenyl, as well as other diaryls, such as dinaphthyl, etc., is shown in the accompanying drawings, wherein Fig. 1 is a vertical sectional view of the chlorinator;

Fig. 2 is a graphical representation showing weight characteristics and specific gravity of monochlordiphenyl obtained by my improved method and apparatus at various stages of the process; and Fig. 3 is a graphical representation showing the specific gravities and viscosities of the higher chlorinated diphenyl at different percentages, by weight, of chlorine.

Referring to the drawings, the chlorinator comprises a cylindrical body 10, preferably made of iron. The body 10 is closed at the lower end with a bottom plate 11 and at the top with a cover plate 12 bolted to a flange 13. The body 10 is provided with a hydrochloric acid gas outlet at 14 and a draw-off cock at 16. An annular coil 17 for the circulation of a heat transfer medium serves to maintain the proper temperature in the reacting mass with which it is in contact. A cylindrical internal container 18 having bottom openings 19 confines a combined catalyst and gas distributor mass 21 which may comprise iron particles of suitable size to permit a full flow of gas and the compound being chlorinated upwardly therethrough. I have found that short sections of relatively small diameter iron pipe, around one-half inch in diameter, are admirably suited for the purpose. A chlorine inlet pipe 22 extends into the lower end of the container 18. A chlorine distributor plate 23 spaced from the lower end of the container 18 supports the mass 21. A thermometer well 24, projecting through the body 10, is provided for reading temperatures of the reacting mass. The body 10 is jacketed by some suitable heat insulating material as shown at 26.

In operation, the chlorinator is filled with molten diphenyl to above the thermometer well 24. Chlorine gas, entering by means of the pipe 22, through the lower end of container 18, passes upwardly through distribution plate 23 and then continues bubbling upwards through the iron catalytic packing mass 21. During its passage through the mass the chlorine is distributed and reacts with the diphenyl with the aid of the iron catalyst, forming chlorodiphenyl and hydrochloric acid. The latter passes upwards and out of the apparatus by means of outlet 14. The rising gases, together with the heat of the reaction, produce a circulation of the liquid reacting mass due to the lesser density of the gas and the increase in temperature, the circulation proceeding as indicated by the arrows upwardly through the catalytic mass, then down through the annular space between the container 18 and the body 10. By means of the heat transfer coil 17, heat may be added or subtracted as desired.

The following examples will serve to illustrate my invention, although it is not to be limited thereby:

*Example I*

Molten diphenyl is poured into the chlorinator until the catalytic packing material is just covered. The flow of chlorine gas is now started, whereupon chlorination proceeds rapidly with considerable evolution of heat. Cooling water must usually be circulated through the coil 17 to keep the temperature, say, at 80° C. Towards the end of the chlorination, the temperature of the reacting mass is decreased to say, 66° C. The progress of chlorination may be readily judged by determining the increase in weight or more conveniently for large batches by determining the specific gravity of samples of the liquid from time to time.

Referring to the chart shown in Figure 2, there is shown the increase in weight of the reaction mixture in pounds per pound of diphenyl at progressively increasing percentages of completion or monochlorodiphenyl, together with corresponding specific gravities. By ascertaining the characteristics of the product as shown by this chart, it is possible to at once ascertain the completeness of the reaction. When the reaction reaches 80 to 85% completion, as determined by specific gravity measurements, the flow of chlorine is stopped, the mass discharged from the chlorinator, washed with water to remove chlorides of iron and then distilled. It will be found that 50 to 80% of the entire reaction mixture will be recovered as monochlorodiphenyl.

*Example II*

If it is desired to produce the higher chlorinated products, it can be conveniently accomplished in the same apparatus as that illustrated in Figure 1, merely by continuing the chlorination and allowing the temperature of the reacting mass to rise to 175–220° C., during the progress of the reaction. When operating with a small apparatus, it may be necessary to supply additional heat to the reacting mass, especially near the end of the reacting period. This is conveniently done by passing a hot fluid through the coils 17 of the apparatus of Figure 1.

Furthermore, by means of my invention it is possible to start with the mono- or dichlorodiphenyl and chlorinate these compounds to a higher chlorine content. It is also possible to chlorinate other diaryls, or substituted diaryls, such as are often formed as by-products in the production of diphenyl.

Fig. 3 of the drawings, curve A, shows the specific gravities of diphenyl when chlorinated to a higher degree than monochlorodiphenyl and up to a point where the chlorine content of the product is as much as 70%, by weight, of the product.

Since the more highly chlorinated diphenyl is solid at ordinary temperature, it is no longer possible to readily determine the specific gravity of the product. A more convenient way of following the progress of the chlorination is to apply the A. S. T. M. softening point test to the product.

Since some of the more highly chlorinated diphenyls are crystalline, while the lower chlorinated diphenyls are liquids at ordinary temperatures, it is not possible to follow the chlorination throughout the entire range of the process by means of a single test. However, the properties of chlorinated diphenyl, at different degrees of chlorination as herein set forth render it possible to estimate approximately the chlorine content of the product.

In the carrying out of my improved process, it is to be noted that at no point in the process is there a uniform chlorination of the mass in the chlorinating vessel. For example, when the process has been continued a sufficient length of time to form mono chlorodiphenyl, there will be found to be in the mass certain percentages of di chlorodiphenyl as well as certain percentages of the material which have not been reacted upon at all.

By referring to the chart given in Fig. 2 of the drawings, it will be noted that this feature of the process results in a range of products varying uniformly in density as the percentage content of chlorine is increased. The range of products is furthermore characterized by varying from a light mobile liquid in the lower percentage of the chlorination up through viscous oils, pitch-like substances and finally ending in a dense hard substance having a crystalline fracture in the higher percentages. I have found that highly practical use may be made of the entire range of products and it is to be understood that my invention is intended to comprehend this range of products. Following is a more detailed table of the properties of chlorinated diphenyl.

*Table of properties of chlorinated diphenyl*

| | Per cent chlorine | Properties at room temperature |
|---|---|---|
| 1 | 18.30 | Very light, mobile liquid. |
| 2 | 27.19 | Light oil, less mobile than (1). |
| 3 | 42.11 | Light oil (density=1.375, at 29° C.). |
| 4 | 42.86 | Oil slightly heavier than (3). |
| 5 | 52.15 | Viscous oil. |
| 6 | 57.19 | Semi-solid, consistency of pitch. |
| 7 | 59.73 | Semi-solid, slightly heavier than (6); softening point, 49.5° C. |
| 8 | 65.26 | Non-crystalline solid, conchoidal fracture; softening point 61.5°; bends if slowly deformed; breaks if rapidly deformed. |
| 9 | 65.40 | Semi-conchoidal fracture, partly crystalline; softening point, 63.5° C. |
| 10 | 66.21 | Crystalline fracture. |

In Fig. 3 of the drawings, curve B shows the varying viscosity in secs. Saybolt at 210° F., of chlorinated diphenyl, varying from slightly above 20% chlorine content to 62% chlorine content.

The Saybolt viscosity determination is a procedure by which the time required for a given volume of liquid to run out of a container having a standard specified orifice is measured. This time is expressed in seconds. This method is described by Scott—Standard Methods of Chemical Analysis, Vol. II, page 1115, 3rd edition, and also in the Standard Methods of Test for Viscosity of Petroleum Products and Lubricants, serial designation D-88 of the American Society for Testing Materials.

From the foregoing it will be apparent that I have devised an improved process for the production of chlorinated diaryls, together with simple improved apparatus for carrying the invention into effect. It will furthermore be apparent that the product produced in my improved process and apparatus is one having definite characteristics whereby it may be identified, throughout the range of practical chlorination.

While I have shown my invention in but one form it will be obvious to those skilled in the art that it is not so limited but is susceptible of various changes and modifications without departing from the spirit thereof and I desire therefore that only such limitations shall be placed thereupon as are imposed by the prior art, or as are specifically set forth in the appended claims.

Having now described my invention, what I claim is:

1. In a process for the catalytic production of chlorinated diphenyl, inducing and maintaining a thermosyphonic flow of the reacting mass through the catalyst by means of the action of the incoming chlorine gas on the diphenyl in the presence of the catalyst.

2. The method of chlorinating diaryl compounds which comprises providing a mass of the compound to be chlorinated, introducing chlorine gas centrally into the bottom of the mass in the presence of an iron catalyst and effecting a flow of the compound over the catalyst by means of the chlorine gas.

3. The method of chlorinating diaryl compounds which consists in providing a mass of the compound to be chlorinated, disposing a catalytic agent centrally of the mass, and effecting a confined flow of the compound upwardly through the catalytic agent by means of a stream of chlorine gas.

4. The method of chlorinating diaryl compounds which consists in providing a mass of the compound to be chlorinated, disposing a catalytic agent centrally of the mass, and effecting a confined thermosyphonic flow of the compound together with chlorine upwardly through the catalytic agent.

5. The method of chlorinating diaryl compounds which consists in providing a mass of the compound to be chlorinated, disposing a catalytic agent centrally of the mass, effecting a confined thermo-syphonic flow of the compound together with chlorine upwardly through the catalytic agent, and controlling the temperature of the reacting mass.

6. A new product comprising a non-uniformly chlorinated mixture of chlorinated diphenyl which at approximately 66% chlorine content is a solid having a crystalline fracture.

7. A new product comprising a non-uniformly chlorinated mixture of chlorinated diphenyl which has a viscosity above 60 seconds Saybolt at 210° F. and with a chlorine content above 55%.

8. A non-uniformly chlorinated diphenyl having a chlorine content of from 40% to 55% in which the viscosity increases from approximately 35 seconds Saybolt at 210° F. to 43 seconds Saybolt as the chlorine content increases from 40% to 50%, and in which the viscosity increases from approximately 43 seconds Saybolt to 60 seconds Saybolt at 210° F. as the chlorine content increases from 50% to 55%.

In testimony whereof I affix my signature.

RUSSELL L. JENKINS.